July 15, 1941.   C. A. BADEAU   2,249,593
INSERTABLE INSULATING BUSHING
Filed April 6, 1939   3 Sheets-Sheet 1

INVENTOR
CARROLL A. BADEAU
BY Bohleber + Ledbetter
ATTORNEYS

July 15, 1941.    C. A. BADEAU    2,249,593
INSERTABLE INSULATING BUSHING
Filed April 6, 1939    3 Sheets-Sheet 2

INVENTOR
CARROLL A. BADEAU
BY Dohleber & Ledbetter
ATTORNEYS

July 15, 1941.            C. A. BADEAU            2,249,593
INSERTABLE INSULATING BUSHING
Filed April 6, 1939           3 Sheets-Sheet 3
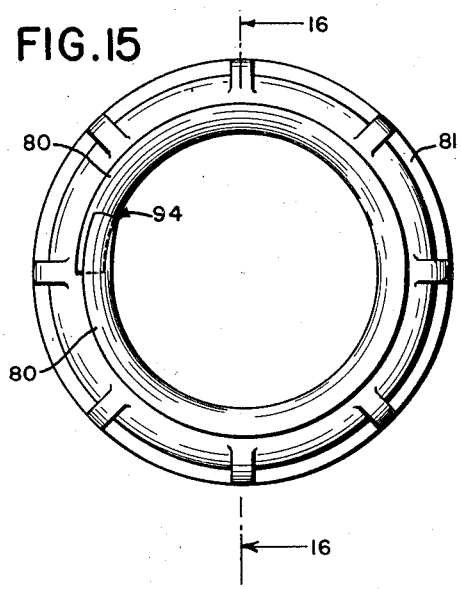
FIG.15
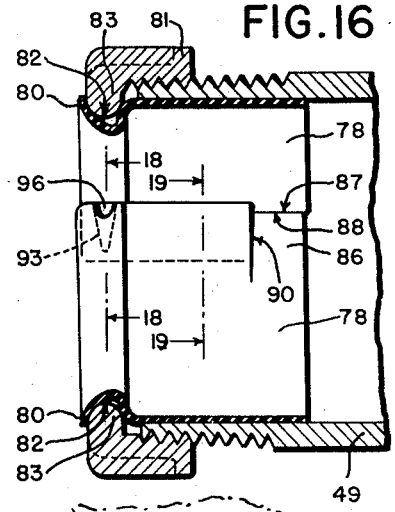
FIG.16
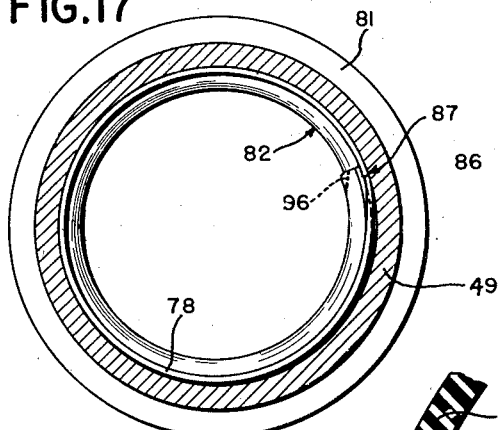
FIG.17   FIG.18
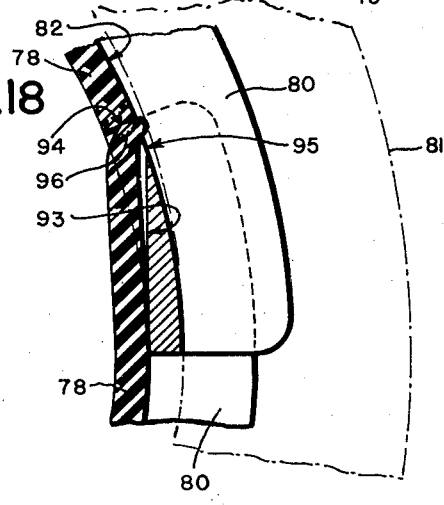
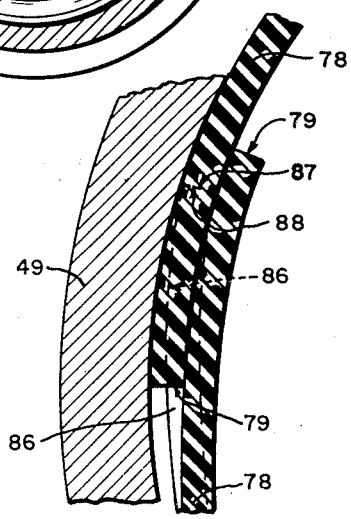
FIG.19
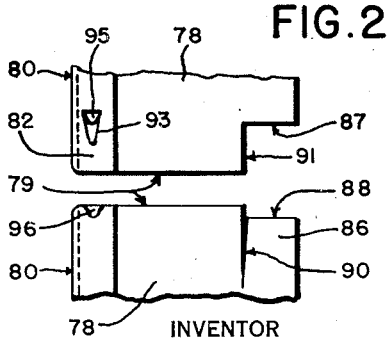
FIG.20
INVENTOR
CARROLL A. BADEAU
BY
Bohleber & Ledbetter
ATTORNEYS Patented July 15, 1941

2,249,593

UNITED STATES PATENT OFFICE 2,249,593

INSERTABLE INSULATING BUSHING

Carroll A. Badeau, Highland Park, N. J., assignor to The Thomas & Betts Co., Elizabeth, N. J., a corporation of New Jersey Application April 6, 1939, Serial No. 266,293

9 Claims. (Cl. 174—83)

The invention relates to an insulating bushing which is adapted to be inserted in conduit assemblies, or the like, forming part of an electrical wiring system. The conduit assembly includes the end of a conduit, pipe or other hollow raceway, and a metallic bushing, conduit fitting, or the like, by which the end of the conduit is attached to an outlet box or the like.

Metallic bushings, conduit fittings, outlet boxes, or the like, which form part of a conduit assembly or electrical-wiring raceway, may have an inwardly directed annular bead which frequently has a ragged edge or rough surface in the form of a sharp fin or projection of metal upon the inner surface thereof. The fin or projection is formed when the metallic bushing or other conduit fitting is molded. The end of a conduit may also have sharp projections and fins. These projections and fins will abrade or cut through the soft insulation of a wire and cause short circuits, such as when the wire is drawn through the conduit assembly, or when connecting fixtures to the wires. The insertable insulating bushing to be described herein is provided in order to protect the wires from such abrading edges and fins.

A general object of the invention is to produce, and a structural embodiment thereof comprises, an insulating sleeve or ring-like bushing in the form of a longitudinally split sleeve rolled or curled from hard or flexible sheet stock, say fiber or the like, the sleeve being radially resilient and necessarily smaller in diameter, when being installed, than the annular metallic bead or bushed conduit mouth of an electrical raceway assembly in order to insert the insulating sleeve into said mouth, and being capable of expansion therein to interline the annular metallic bead with smooth insulation, together with an annular groove in the insulating sleeve which registers with the annular metallic bead, as well as having latching means on the sleeve edges to positively hold said sleeve to its finally expanded diameter, whereby the pull and drag of the electrical wires when being installed in the raceway cannot dislodge one sleeve edge from another, with the result that the expanded diameter of the latched-edges of the sleeve acts to positively maintain its annular groove in expanded registry with the annular metallic bead to anchor the insulating sleeve in the conduit mouth.

It is an object of the invention to provide a new and novel insertable insulating bushing for lining the mouth of conduit assemblies and the like and thereby shielding the soft insulation of a wire from any sharp edges which may exist in the raceway mouth opening into the electrical box.

Another object of the invention is to construct an insertable insulating bushing which can be circumferentially contracted for insertion within a conduit assembly and the like, and then circumferentially expanded until it engages and grips the inner circumference of the conduit assembly or a part thereof, whereupon locking means interengage to prevent circumferential contraction of the bushing and also to prevent relative movement of one longitudinal edge of the bushing with respect to the other longitudinal edge and hence lock the expanded insulating bushing within the conduit assembly.

Another object of the invention is to provide an insertable insulating bushing having longitudinal edges which abut when the bushing has been inserted and circumferentially expanded within a conduit assembly or the like, and which bushing also provides cooperating locking means upon or adjacent each longitudinal edge thereof which interengage to prevent relative longitudinal movement between the edges of the bushing so that the latter is locked in position against displacement by the friction of the wires being pulled through the raceway.

Another object is to construct a split insertable insulating bushing which is circumferentially contracted for insertion in a conduit assembly and then expanded therein until it engages and grips the inside of the assembly in which position the longitudinal edges of the sleeve overlap. With these longitudinal edges overlapping, means are provided to prevent circumferential contraction of the bushing and to prevent relative longitudinal movement between the longitudinal edges and hence lock the insulating bushing in place.

Another object of the invention is to construct a conduit assembly which is insulated from the wires by a bushing which is locked or retained in position in a new and novel manner.

Other objects of the invention will be more apparent from the following description taken in connection with the accompanying drawings, illustrating some preferred embodiments of the invention, but omitting the wiring from the raceway for clarity, in which:

Figure 1 is an end view of an insertable insulating bushing locked in position within a conduit assembly which includes a metallic bushing, a threaded conduit end, and a lock nut. The metallic bushing and lock nut secure the end of the conduit within a box hole opening.

Figure 2 is a longitudinal section through the mouth of the raceway assembly where it opens into an electrical box, as taken on line 2—2 of Figure 1, showing the insertable insulating bushing in position within the metallic bushing and conduit.

Figure 3 is a section, taken on line 3—3 of Figure 2, showing the abutting longitudinal edges which prevent circumferential contraction of the insulating bushing after it has been inserted and expanded within the metallic bushing and conduit.

Figure 4 is an end view of the conduit raceway assembly from the inside of the conduit looking towards the open end thereof.

Figure 5 is an inner end view of the insertable insulating bushing alone as it normally appears in expanded condition, and shows the longitudinal slot or slit therethrough so that the insulating bushing is rendered flexible for circumferential contraction into a conduit assembly and the like.

Figure 6 is a side elevation of the insertable insulating bushing alone showing a pair of locking tabs adjacent one longitudinal edge of the bushing and a locking recess in the other longitudinal edge for receiving one of the tabs.

Figure 7 is a front elevation of the insertable insulating bushing alone in the position it assumes when inserted and expanded in a smaller diameter of conduit assembly where the second tab illustrated is used. Incidentally, this view also shows how the insulating bushing is circumferentially contracted for insertion in a larger conduit assembly such as that show in Figure 2.

Figure 8 is an inside box end view of the insertable insulating bushing assembled within a conduit connection or fitting, carried by an integral part of a box, and within the conduit connected therewith.

Figure 8:
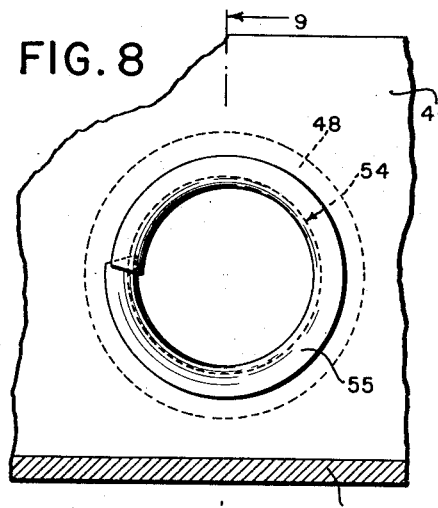
Figures 8 through 12 show a second form of insertable insulating bushing.
Figure 9:
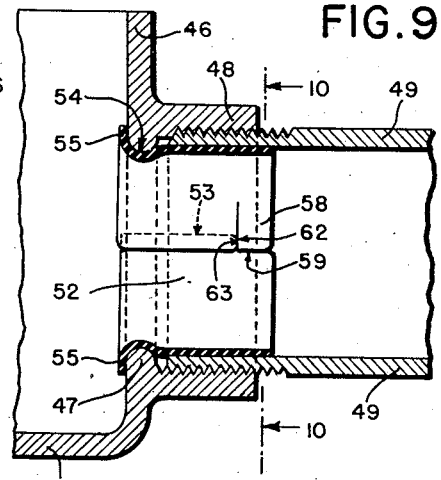

Figure 9 is a longitudinal section through a box, a conduit fitting which is integral with the box, and a conduit which is threadedly secured to the conduit fitting. The insertable insulating bushing is shown positioned within the conduit assembly. This view is taken on the line 9—9 of Figure 8.

Figure 10:
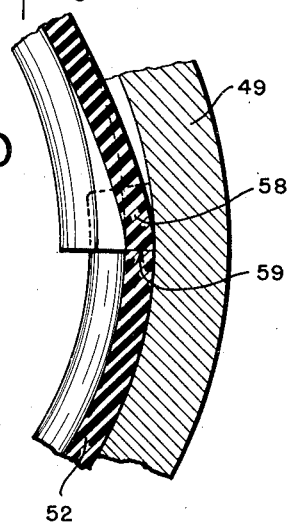

Figure 10 is an enlarged fragmentary view of the insertable insulating bushing positioned within the conduit and conduit fitting. This view is taken looking towards the box, as on the section line 10—10.

Figure 11:
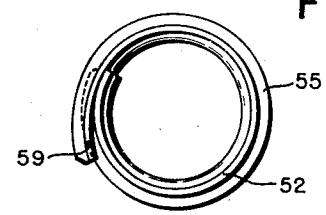

Figure 11 is an end view of the insertable insulating bushing alone and circumferentially contracted ready for insertion in position within the conduit fitting and conduit.

Figure 12:
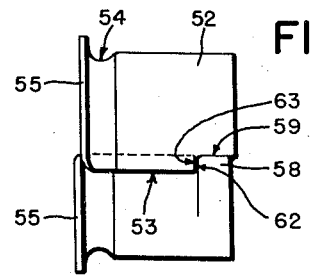

Figure 12 is a side elevation of the insertable insulating bushing alone in the position which it assumes when within a conduit assembly or the like. The longitudinal edges of the insulating bushing are shown locked against relative longitudinal movement or displacement.

Figure 13:
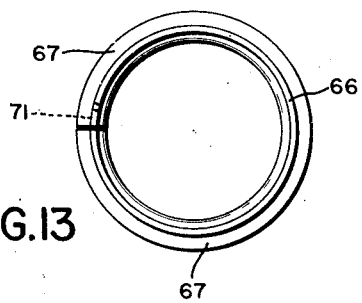
Figure 14:
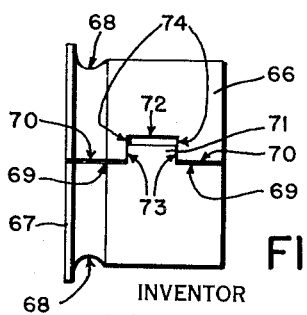

Figures 13 and 14 illustrate a third form of the invention, wherein the adjacent edges abut to form a smooth bore bushing, instead of overlapping as in other views.

Figure 13 is an end view of the third form of insertable insulating bushing in the position which it assumes when expanded within a conduit assembly or the like.

Figure 14 is a side elevation of the insulating bushing of Figure 13 showing the manner in which the longitudinal edges of the bushing abut each other, and showing the interengaging means which locks the longitudinal edges of the bushing against relative axial or longitudinal movement.

Figures 15 through 20 illustrate a fourth form of the invention which is intended particularly for larger diameters of metallic bushings, conduit fittings, conduit, and the like.

Figure 15 is an end view of the insertable insulating bushing in final position within a metallic bushing and the end of a conduit, the conduit being threaded into the metallic bushing.

Figure 16 is a longitudinal section on the line 16—16 through the metallic bushing, conduit, and insulating bushing, and shows the manner in which the ends of the bushing cooperate to lock the insulating bushing in position.

Figure 17 is an inside end view of the bushing in position within the end of the conduit and the metallic bushing, looking towards the box end of the conduit.

Figure 18 is an enlarged partial section, taken on line 18—18 of Figure 16, showing the locking means which locks the insulating bushing in place within a conduit assembly or the like.

Figure 19 is an enlarged partial section, taken on line 19—19 of Figure 16, and shows the interengagement of the abutting longitudinal edges of the insulating bushing which prevents circumferential contraction of the bushing after it has been inserted and expanded within the conduit, conduit fitting, or the like.

Figure 20 is a view of a fragment of the insertable insulating bushing at the slot and shows the construction of its locking means for anchoring the bushing in place within the raceway.

Insertable insulating bushings heretofore have been provided in order to protect the soft insulation of wires against abrasion from sharp projections in the raceway mouth where the wires enter the box. The insulating bushings heretofore known, however, made no provision for preventing both circumferential contraction of the bushing and longitudinal movement or misplacement of one longitudinal edge of the bushing relatively to the other. For this reason, bushings heretofore known would frequently be pulled out of the end of a conduit and conduit fitting because the wire being pulled through and rubbing upon one side or edge of the insulating bushing, adjacent its slot, would pull this edge at least partially out of the conduit assembly. When the insulating bushing is thus partially displaced it will no longer hold its position in the raceway mouth opening into the box.

The invention herein overcomes the above difficulty by the provision of longitudinal edges which can and do come together into latched abutting relation and are held against sidewise displacement when the bushing is expanded into position within the conduit, or the like, and so prevent accidental circumferential contraction of the insulating bushing. Accordingly, the bushing herein provides interengaging means upon the edges thereof which prevents movement of at least one longitudinal edge of the bushing relatively ot the other and thus locks the bushing in place.

In the assembling of a wiring system, the electrical wires are frequently run to a box B wherein switches, or other electrical equipment, are contained, or within which electrical connections are made. The wires are conducted to the boxes through rigid conduit, flexible conduit, and the like, and the conduit is secured within a box opening by suitable conduit fittings which may be an integral part of the box or may be separate parts, both of which forms are illustrated herein.

The insertable insulating bushing of Figures 1 through 7 is shown retained in a conduit assembly which includes a conduit fitting in the form of a metallic threaded bushing 20 on the end of a conduit 22. The metallic bushing has an inwardly directed annular bead 21 forming a smooth rounded mouth which opens into the box B. This metallic bead 20, and others shown in the drawings, frequently have sharp fins or other projections at the rounded mouth which would cut into the soft insulation of a wire or cable either when the wire is being pulled through the conduit system, or after it has been so pulled therethrough. The metallic bushing 20 is threadedly received upon the end of the conduit 22. A nut or locking washer 23, which also forms a part of the conduit assembly, cooperates with the metallic bushing 20 to retain the end of the conduit within the hole H of the box B. Frequently the end of the conduit also carries a sharp fin or projections which also would cut into the insulation of a wire so that this insulation must be protected therefrom.

The insertable insulating bushing is made from resilient insulating sheet material or hard flat stock such as sheet fiber to form a sleeve 26 which has a slot or slit 27 extending lengthwise therethrough from end to end thereof so that the bushing can be circumferentially contracted by overlapping the longitudinal ends thereof. The slot 27 thus formed may be straight, irregular, or stepped, as desired. The bushing, when so circumferentially contracted, is readily inserted within a conduit assembly, such as a metallic bushing 20 or the like, and a conduit 22. After insertion of the insulating bushing in position, the resiliency or uncurling force of the bushing expands the same until it engages the inner surfaces of the raceway and in particular grips the mouth of the bushing 21. An inwardly directed circumferential groove 28 is provided adjacent the end of the sleeve, which groove is adapted to receive the bead 21 upon the metallic bushing 20. The bead engaging in and registering with the groove holds the bushing from being pulled out of the conduit assembly. The insulating bushing sleeve 26 also may be provided with an outwardly extending flange 29 which seats against inner end of the bushing.

The sleeve 26, and others shown as examples herein, may be formed by slitting at 27 a continuous or seamless ring of flexible insulating material, such as fiber tubing. However, the simplest method of forming the ring-like sleeve probably is by taking a flat rectangular strip of hard resilient and springy insulating material, say thin sheet fiber, and rolling or pressing the annular groove 28 therein, and then rolling or curling or pressing the grooved strip into circular or sleeve form, thereby providing longitudinal edges 27 which fit and latch together (as later explained) to hold the strip in sleeve form. It is immaterial, so far as the invention is concerned, how the split sleeve is formed.

The split sleeve being radially or circumferentially resilient is necessarily smaller in diameter than the bushed metallic mouth of the raceway at the moment of inserting the sleeve into said mouth, whereupon the sleeve springs or is sprung, due to its permissive expansibility, until its lengthwise edges 27 come together or toward each other to assume sleeve form for interlining the conduit and bushed mouth which opens into the electrical box. The normal expansive resiliency of the split insulating sleeve will impart a gripping action against the inner metallic surfaces of the conduit assembly, particularly the annularly beaded metallic mouth 21 of the raceway, whereby this expansion under strain aids in retaining the sleeve in locked position.

The sleeve 26 is provided with interengaging edges 32 and 33 at the slit 27 which abut each other when the sleeve is in position and thereby lock and prevent circumferential contraction thereof. The latching edge 32 is provided at the inner end of a recess formed by circumferentially extending edges 34. The other latching edge 33 is carried upon the end of a tab 35 struck-up from the sleeve upon the other side of the slit 27 and said tab 35 has circumferentially extending edges 36.

It will be observed that when the sleeve 26 is circumferentially contracted by overlapping the slit edges 27 thereof and the sleeve is then inserted within a conduit assembly, upon release of the bushing or sleeve, its resiliency expands the same circumferentially. In this circumferential expansion of the sleeve 26, the tab 35 will ride over the outer surface of the sleeve until the recess 34 is reached, whereupon the tab will snap into the recess. The circumferential dimension between the abutting locking edges 32 and 33 on opposite sides of the slit 27 engage very closely upon the full expansion of the sleeve permitted by the inside diameter of the conduit assembly. This means that the lacking edges 32 and 33 abut each other and prevent normal circumferential contraction of the sleeve 26 when it is snapped into the mouth 21 of the bushing.

The recess 34 registering with the tab or ear 35 also provides the interengaging means which locks the longitudinal edges 27 of the sleeve against relatively longitudinal or axial displacement. In other words, the circumferential edges 36 of the tab 35 engage the circumferential edges 34 of the recess so that when the tab engages within the recess, the adjacent longitudinal edges 27 of the sleeve or locked against relative axial or longitudinal movement. It will be observed, therefore, that a wire being pulled through the sleeve does not brush against a displaced edge 27 thereof to dislodge it from the conduit assembly. Because of this locking means 32, 33 preventing relative longitudinal movement between the longitudinal edges 27 of the sleeve and also preventing circumferential contraction thereof, the bushing is locked in position within the conduit assembly.

A second tab 39 may also be provided adjacent the longitudinal edge 27 of the sleeve and spaced from the tab 35. This tab 39 will also be provided with a longitudinal abutting edge 40 which is adapted to abut the longitudinal edge 32 at the bottom of the recess 34. This tab also has circumferentially extending edges 41 which also cooperate with the circumferentially extending edges 34 of the recess to lock the longitudinal ends or edges of the bushing against relative longitudinal movement. The two tabs 39 and 35 are provided for conduits having different internal circumferences or different internal diameters, the tab 39 of course being adapted for smaller diameter of conduit.

Figure 2:
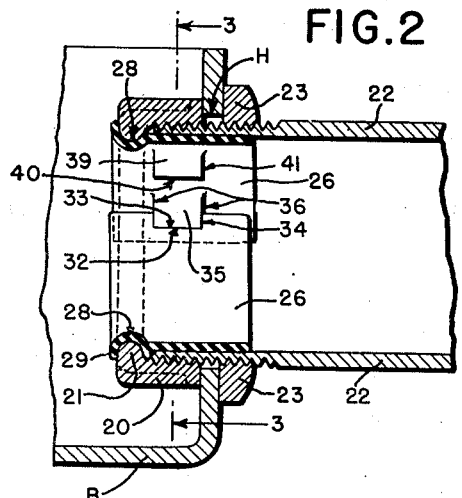
Figure 3:
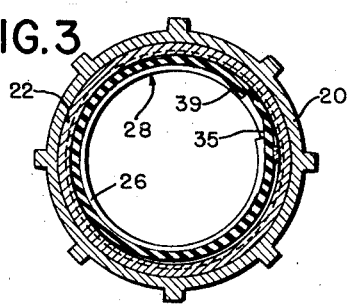
Figure 4:
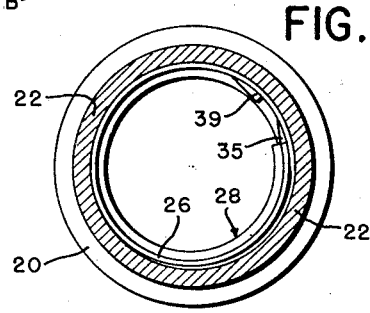
Figure 5:
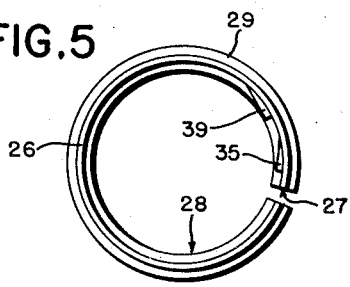
Figure 6:
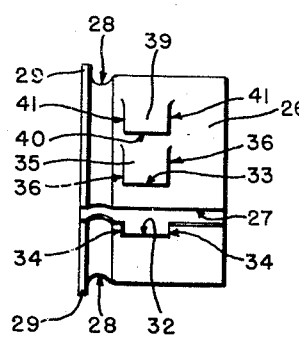
Figure 7:
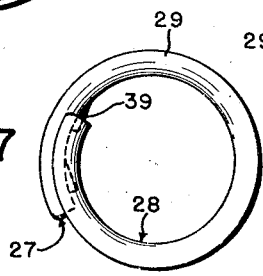

As illustrated by the horizontal dotted line in Figure 2, the longitudinal edges of the sleeve 26 overlap each other, and the locking edges 32 and 33 flushly abut each other so that no part of the conduit or metallic bushing is exposed at the insulating bushing. This assures positive insulation of the wires at this point as well as a smooth surface which will not injure the wire or cable insulation.

Figure 1:
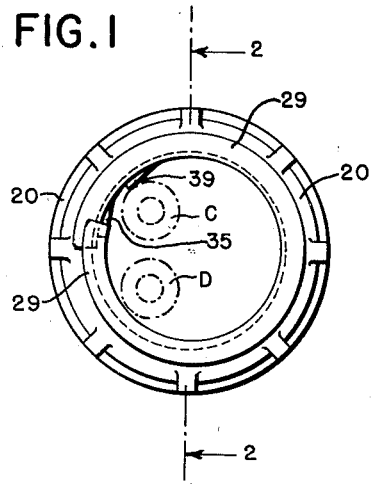
Figures 1 through 7 show a first form of the invention.

It will be noted, as shown particularly in Figure 1, that one edge of the flange 29 overlaps the other edge thereof. If a wire were being pulled through the conduit and engaged the bushing in position C, which would tend to pull this edge of the sleeve outwardly, this pull would be prevented by the overlapping flange edges. If, however, the wire being pulled through the conduit happens to take the position D, then the rubbing of the wire upon the sleeve would tend to pull this end of the sleeve out of the conduit and the fitting. This outward or relative movement of this end of the sleeve is not prevented by the flange 29. It is, however, prevented by the locking means formed by the tab 35 seated in the recess 34. The overlapping of the flange augments or provides an additional means for preventing relative longitudinal movement of one longitudinal edge with respect to the other.

The overlapping of the edges of the annular groove 28 also tends to form locking means preventing relative movement of the longitudnal edges of the sleeve. Since, however, the inner surface of the groove is rounded there is in effect a frictionless brushing action here, and so long as a circular groove is provided, the overlapping groove will not be as efficacious for locking the longitudinal edges of the sleeve against relative movement as the locking means afforded by the tab 35 and recess. However, the combined action of the locking recess and ear means 32, 35 with the overlapping of the edges of the groove, anchors the bushing sleeve 26 in place against the pulling action of the wires.

The second form of the invention illustrated in Figures 8 through 12 is shown in use with a different kind of box than that illustrated in Figure 2. The box 46, shown in Figure 9, has an inwardly directed bead 47 which forms the mouth or opening into the box. The box has an extension or neck 48 which may be internally threaded to receive the threaded end of a conduit 49. The threaded connection is merely illustrative of one method of securing a conduit, or other hollow raceway, to a box. The extension 48 and the inwardly directed bead 47 are in effect and result a conduit fitting for attaching the conduit to the box 46. It is immaterial whether the conduit fitting is integral or a separate part from the box or other means to which the conduit is to be secured.

An insertable insulating bushing is inserted into the opening formed by the bead 47 in order to protect the soft insulation of wires being pulled therethrough against sharp fins and projections upon the surface of the bead and the edge of the conduit. This insertable insulating bushing comprises a sleeve 52 having a single through slot 53 extending through the bushing from end to end thereof. The sleeve is of flexible insulating material so that it may be contracted for insertion within a conduit assembly, after which its resiliency circumferentially expands the same to fit snugly within the conduit assembly.

The sleeve 52 may have an inwardly directed circumferential groove 54, and adjacent the groove there may be an outwardly directed circumferentially extending flange 55. The groove is adapted to receive the bead 47 and the flange is adapted to engage the face of the bead or the face of the box wall, depending upon the type of conduit fitting into which the insulating bushing is inserted. The lengthwise edges of the circumferential flange 55 overlap in the final position of the sleeve within the conduit assembly, so that the outer overlapping end of the flange prevents outward movement of the other end of the flange which is overlapped, and hence prevents outward movement of the corresponding longitudinal edge of the sleeve. In other words, longitudinal movement between one longitudinal edge of the sleeve relatively to the other is prevented.

The sleeve 52 has a tab 58 at one of the longitudinal edges of the sleeve and which is also at the inner end of the sleeve. The end of this tab is received in a recess 59 upon the other longitudinal edge of the sleeve. The tab is struck outwardly from the general circle of the cylindrical sleeve so that when the longitudinal edges of the sleeve overlap, the end of longitudinal edge of the tab 58 abuts the bottom or longitudinal edge of the recess 59 and thereby prevents circumferential contraction of the sleeve. The tab and recess, however, permit the sleeve to be circumferentially contracted so that the sleeve may be inserted in a conduit assembly, after which the resiliency of the sleeve expands it circumferentially until the tab 58 drops into the recess and the respective longitudinal edges come into abutting relation. The abutting edges of the tab and recess lock the bushing against normal circumferential contraction and hence aid in locking the bushing within the conduit assembly.

The circumferential edge 62 of the tab engages the circumferential edge 63 of the recess. This interengagement of the circumferential edges of the tab and the recess prevents relative axial movement to the left or movement outward from the box hole of Figure 9 of the inner longitudinal edge of the sleeve, which is illustrated in dotted lines in Figure 12. In other words, the overlapping edges of the flange 55 prevent relative movement of the longitudinal edges of the sleeve in one direction, and the circumferential edges of the tab and the recess prevent relative longitudinal movement between the longitudinal edges of the sleeve in the other direction. Each longitudinal edge of the sleeve is therefore held against relative movement with respect to the other, so that the bushing is locked in position and can only be removed by forcing the longitudinal edge which carries the tab 58 inwardly so that the abutting edges are no longer in abutting relation, after which the bushing can be readily pulled out of the conduit assembly.

It will be observed that the longitudinal edge of the tab 58, when abutting the bottom of the recess 59, forms a tight seal against contact of a wire with the conduit at this point, and the overlapping longitudinal edges over the rest of the length of the sleeve prevent any engagement of the wire with the conduit. A positive insulating sleeve is therefore provided.

Another form of construction is illustrated in Figures 13 and 14. This construction is somewhat similar to that illustrated in Figures 1 through 7, but differs therefrom in that the longitudinal edges of the sleeve do not overlap when the insertable bushing is expanded in a conduit assembly. This bushing comprises a sleeve 66 of flexible insulating material having a single longitudinal slot therethrough whereby the sleeve may be contracted with the longitudinal edges overlapping for insertion in a conduit assembly. A circumferential flange 67 may be provided at one end of the sleeve 66 to engage the face of a bead upon a conduit fitting, or the like, and also may have an inwardly directed groove 68 to receive the inwardly directed bead upon the conduit fitting or the like.

The longitudinal edges 69 and 70 of this sleeve come into abutting relation when the sleeve is expanded within a conduit assembly or the like. One of the longitudinal edges has a tab or extension 71 which engages in a recess 72 in the other longitudinal edge of the sleeve. The circumferentially extending edges 73 of the tab engage the circumferential edges 74 of the recess so that longitudinal or axial movement of one longitudinal edge of the sleeve relatively to the other longitudinal edge is prevented. In this construction the sleeve is circumferentially contracted by overlapping the longitudinal edges thereof and inserting the same within the conduit assembly, or the like, after which the resiliency of the sleeve expands it until the longitudinal edges 69 and 70 come into abutting relation and the tab 71 snaps and locks into the recess 72. In this construction, the abutting longitudinal edges lock the bushing against circumferential contraction, and the interengaging circumferential edges of the tab and recess means 71, 72 prevent movement of one longitudinal edge of the sleeve relatively to the other in a longitudinal or axial direction, whereby the bushing is locked in position.

A fourth form of the invention is illustrated in Figures 15 through 20 which is intended principally for large diameter insertable insulating bushings adapted to be used in large diameter conduit assemblies for large sized pipes and the like. This form of insertable insulating bushing is constructed like that illustrated in Figures 8 through 12, but adds other locking features thereto.

The insertable insulating bushing shown in Figures 15 through 20 comprises a sleeve 78 made of resilient insulating material, say hard sheet fiber. The sleeve has a single slit or slot 79 extending from end to end thereof so that wires already connected in an electrical system may pass through the slot to the inside of the sleeve. The longitudinally extending slot then permits the sleeve to be circumferentially contracted with the longitudinal ends of the sleeve overlapping so that it may be inserted into position within a conduit assembly or the like. The sleeve has a circumferential flange 80 at its outer end adapted to seat against a conduit fitting, such as a metallic bushing 81 or the like. An inwardly directed circumferential groove 82 is provided adjacent the flange 80 to receive an inwardly directed bead 83 carried by the metallic bushing 81.

A locking tab 86 is carried at or adjacent to one longitudinal edge of the sleeve 78 for engagement in a locking recess 87 at or adjacent to the other longitudinal edge of the sleeve. The tab 86 is struck outwardly so that when the longitudinal edges of the sleeve overlap, the tab edge 88 will register in the recess edge 87. These locking edge means 86, 87 prevent circumferential contraction of the sleeve when it has been inserted in a conduit assembly or the like, in the same manner as described and discussed in connection with the constructions of Figures 8 through 12.

The circumferential locking edge 90 of the tab 86 engages the locking edge 91 of the recess notch 87 so that longitudinal or axial movement of one longitudinal sleeve edge 79 is prevented relatively to the other in one direction. The overlapping of one edge of the flange 80 over the other edge of the flange prevents relative longitudinal or axial movement of the other longitudinal edge 79 of the sleeve in the other direction. The longitudinal edges of the sleeve are, therefore, locked or interlocked against axial relative movement in either an inwardly or outwardly direction.

A recess 93 is cut into the circumferential bead formed when the inwardly directed groove 82 is formed, which recess provides a shoulder 94. The recess also passes through the thickness of the sleeve so that an opening or hole 95 is formed spaced from one longitudinal edge of the sleeve. An inwardly directed nub or projection 96 is struck outwardly at the bottom of the bead and at the other longitudinal edge of the sleeve, which nub or projection engages in the hole 95 when the sleeve is expanded into final position within a conduit assembly or the like. The longitudinal edge of the sleeve abuts the shoulder 94, as illustrated in Figure 15, so that the sleeve is retained against circumferential contraction when in final position. In other words, in this insertable insulating bushing for larger sizes of conduit and conduit fittings, two pairs of longitudinally abutting edges 87, 88 and 94, 96 are provided adjacent each end of the sleeve in order to prevent circumferential contraction thereof, and the projection 96 engaging in the hole 95 practically prevents removal of the sleeve from the conduit assembly when the bushing has once been inserted into final position within the assembly.

It will be observed that in each of the insertable insulating bushings described herein, longitudinal abutting means, such as abutting longitudinal locking edges, are provided which come into abutting engagement when the insulating bushing, which is contracted by overlapping the longitudinal edges thereof, is expanded within a conduit assembly. In each form of the invention, the abutting longitudinal means or edges prevent circumferential contraction of the insulating bushing when it is expanded within a conduit assembly.

In addition to the abutting longitudinal means, means are provided with each form of insertable insulating bushing which prevent relative longitudinal movement between the longitudinal edges thereof in at least one direction and preferably in both directions as illustrated in each form of the invention. The insertable bushing is made from resilient insulating material such as hard sheet fiber and normally larger than the conduit assembly to receive the same, so that the resiliency of the insertable bushing aids in retaining the bushing therewithin and because of its tendency to expand also keeps the longitudinal abutting means in closely opposed or abutting relation.

The single through slot extending from end to end of the insertable bushing permits the same to be circumferentially contracted by overlapping the longitudinal edges thereof, and the abutting longitudinal means permit this overlapping and withal come into abutting relation merely upon expansion of the insertable insulating bushing within a conduit assembly.

The groove in the insulating bushing at one end thereof engages a bead upon a conduit fitting, or the like, to retain the bushing within the conduit assembly against longitudinal displacement due to the fact that the latched edges maintain the sleeve in true cylindrical form by preventing either of said edges from becoming displaced sidewise in the conduit.

This invention is presented to fill a need for improvements in an insertable insulating bushing. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. An insulating bushing for insertion into a wiring raceway assembly comprising a sleeve of flexible insulating material having a slot extending lengthwise from end to end thereof so that wires may be inserted therethrough and so that the sleeve may be contracted circumferentially with its edges at the slot initially overlapping for insertion in the raceway and then expanded, the slot defining longitudinal edges of the sleeve, abutting edges adjacent the longitudinal edges of the sleeve which come into abutting relation when the sleeve is inserted in the raceway and expanded therein, and an inwardly directed circumferential groove in the sleeve forming a bead upon the inner surface thereof, the edges of the bead upon each side of the slot interengaging, when the abutting edges abut each other, for holding the adjacent longitudinal edges of the sleeve against relative longitudinal movement.

2. An insulating bushing for insertion into a wiring raceway assembly and the like comprising a sleeve of flexible insulating material having a single slot extending longitudinally from end to end thereof so that wires may be inserted therethrough and so that the sleeve may be contracted circumferentially with its edges overlapping for insertion in a conduit assembly or the like, the slot forming longitudinal edges as aforesaid upon the sleeve, a recess in one longitudinal edge of the sleeve having circumferentially extending edges, a tab spaced from the other longitudinal sleeve edge and having a circumferentially extending edge upon each side thereof, the recess and the tab forming longitudinally abutting edges upon the sleeve which come into abutting relation when the sleeve is circumferentially contracted and inserted in a conduit assembly or the like and then circumferentially expanded therein, the circumferential edges of the tab and of the recess interengaging to lock the edges against relative longitudinal movement, and the edges of the sleeve upon each side of the longitudinal slot overlapping when the abutting edges abut each other.

3. An insulating bushing for insertion into a wiring raceway assembly and the like, comprising a sleeve of flexible insulating material having a single slot extending longitudinally from end to end thereof so that wires may be inserted therethrough and so that the sleeve may be contracted circumferentially with its edges overlapping for insertion in a conduit assembly or the like, the slot forming longitudinal edges as aforesaid upon the sleeve, a recess in one longitudinal edge of the sleeve having circumferentially extending edges, a tab spaced from the other longitudinal sleeve edge and having a circumferentially extending edge upon each side thereof, the recess and the tab forming longitudinally abutting edges upon the sleeve which come into abutting relation when the sleeve is circumferentially contracted and inserted in a conduit assembly or the like and then circumferentially expanded therein, the circumferential edges of the tab and of the recess interengaging to lock the edges against relative longitudinal movement, and an inwardly directed circumferential groove in the sleeve forming a bead upon the inner surface thereof.

4. An insulating bushing for insertion into a wiring raceway assembly and the like comprising a sleeve of flexible insulating material having a single slot extending longitudinally from end to end thereof so that wires may be inserted therethrough and so that the sleeve may be contracted circumferentially with its edges overlapping for insertion in a conduit assembly or the like, the slot forming longitudinal edges as aforesaid upon the sleeve, a recess in one longitudinal edge of the sleeve having circumferentially extending edges, a pair of tabs spaced circumferentially from each other and each tab having a circumferentially extending edge upon each side thereof, the recess and each tab forming longitudinally abutting edges upon the sleeve, the longitudinally abutting edge of one of the tabs coming into abutting relation with the abutting edge of the recess when the sleeve is circumferentially contracted and inserted in a conduit assembly or the like and then circumferentially expanded therein, and the circumferential edges of the tab and of the recess interengaging to lock the longitudinal edges against relative longitudinal movement.

5. An insertable insulating bushing for a wiring raceway conduit assembly or the like, comprising a sleeve of flexible insulating material having a slot extending longitudinally from end to end thereof so that wires may be inserted therethrough and so that the sleeve may be circumferentially contracted with its longitudinal edges overlapping for insertion in a conduit assembly or the like, a recess upon one side of the slot of the sleeve having a longitudinal edge and a circumferentially extending edge, a tab upon the other side of the slot having a longitudinal edge and a circumferentially extending edge, the longitudinal edges coming into abutting relation when the sleeve is inserted in a conduit assembly or the like and expanded therein, an inwardly directed circumferential bead and an outwardly directed circumferential flange at one end of the sleeve, the edges of the flange at the slot overlapping to prevent axial movement of one longitudinal edge of the sleeve relatively to the other in one direction, and the circumferentially extending edge of the tab engaging the circumferentially extending edge of the recess when the longitudinal edges abut each other, the flange and the circumferentially extending edge of the tab holding the adjacent longitudinal edges of the sleeve against relative longitudinal movement.

6. An insertable insulating bushing for a wiring raceway conduit assembly or the like, comprising a sleeve of flexible insulating material having a slot extending longitudinally from end to end thereof so that wires may be inserted therethrough and so that the sleeve may be circumferentially contracted with the longitudinal edges overlapping for insertion in a conduit assembly or the like, a recess upon one side of the slot of the sleeve having a longitudinal edge and a circumferentially extending edge, a tab upon the other side of the slot having a longitudinal edge and a circumferentially extending edge, the longitudinal edges coming into abutting relation when the sleeve is inserted in a conduit assembly or the like and expanded therein, an inwardly directed circumferential bead and an outwardly directed flange at one end of the sleeve, the edges of the flange at the slot overlapping to prevent axial movement of one longitudinal edge of the sleeve relatively to the other in one direction, the circumferentially extending edge of the tab engaging the circumferentially extending edge of the recess when the longitudinal edges about each other, the flange and the circumferentially extending edge of the tab holding the adjacent longitudinal edges of the sleeve against relative axial movement, and a notch in the bead providing an abutting edge and engaging the longitudinal edge of the sleeve when the latter is expanded in a conduit fitting or the like to aid in preventing circumferential contraction of the sleeve when the latter has been inserted in a conduit assembly.

7. An insertable insulating bushing for a conduit assembly and the like, comprising a sleeve of flexible insulating material having a slot extending longitudinally from end to end thereof so that the sleeve may be opened for insertion of wires thereinto and circumferentially contracted with its longitudinal edges overlapping for insertion in a conduit assembly or the like, a recess upon one side of the slot of the sleeve having a longitudinal edge and a circumferentially extending edge, a tab upon the other side of the slot having a longitudinal edge and a circumferentially extending edge, the longitudinal edges coming into abutting relation when the sleeve is inserted in a conduit assembly or the like and expanded therein, an inwardly directed circumferential bead and an outwardly directed flange at one end of the sleeve, the edges of which flange at the slot overlap to prevent axial movement of one longitudinal edge of the sleeve relatively to the other in one direction, and the circumferentially extending edge of the tab engaging the circumferentially extending edge of the recess when the longitudinal edges abut each other, the overlapping edges of the flange and the circumferentially extending edge of the tab holding the adjacent longitudinal edges of the sleeve against relative axial movement, a notch in the bead providing an abutting edge and a hole through the bead on one side of the slot, the edge of the notch and the longitudinal edge of the sleeve abutting each other when the sleeve is expanded in a conduit assembly or the like, and a projection carried by the bead on the other side of the slot which engages in the hole to lock the edges together.

8. An insulating bushing adapted to shield the electrical wiring in the metallic conduit mouth of a raceway assembly having an annular metallic bead opening into an electrical box or the like; comprising a sheet of hard resilient insulation curled into sleeve form initially larger in diameter than the raceway mouth, but capable of contraction for insertion thereinto, and expandable therein by its uncurling force to grip the inside of said mouth by expansive-pressure engagement with the annular metallic bead thereof; the sleeve having a longitudinal slit forming adjacent cooperating longitudinal edges which come together proximate one with the other for covering the raceway, resilient tab means struck-up from the sheet adjacent one edge thereof, recess means notched into the sheet adjacent its other edge; the tab and recess means operative to snap into interengagement by the uncurling force aforesaid, thereby latching one longitudinal sleeve edge with the other when said edges come together as aforesaid, for maintaining the sleeve in true cylindrical form throughout its length, thereby securing said longitudinal edges against sidewise displacement when wires are pulled through the insulating sleeve, and an annular groove formed in one end of the insulating sleeve adapted to receive the annular metallic bead aforesaid for holding said sleeve against longitudinal displacement from the raceway mouth.

9. An insulating bushing adapted to shield the electrical wiring in the metallic conduit mouth of an ordinary raceway assembly having the usual annular metallic bead which opens into an electrical box or the like; said insulating bushing comprising a sheet of hard insulation curled into a split resilient ring-like sleeve having longitudinal edges, the resilient sleeve being smaller in diameter than the annular metallic bead of the raceway assembly when inserted thereinto and then expansible in diameter for engagement with said annular metallic bead and for springing the edges toward closing relation with each other, an annular groove formed in the insulating sleeve for registry with the annual metallic bead to interline the same, and latching means on the insulating sleeve edges interlocking with each other to maintain the expanded diameter of said sleeve, whereby its annular insulating groove is anchored in registry with the annular metallic bead against longitudinal displacement therefrom.

CARROLL A. BADEAU.